Patented Apr. 16, 1929.

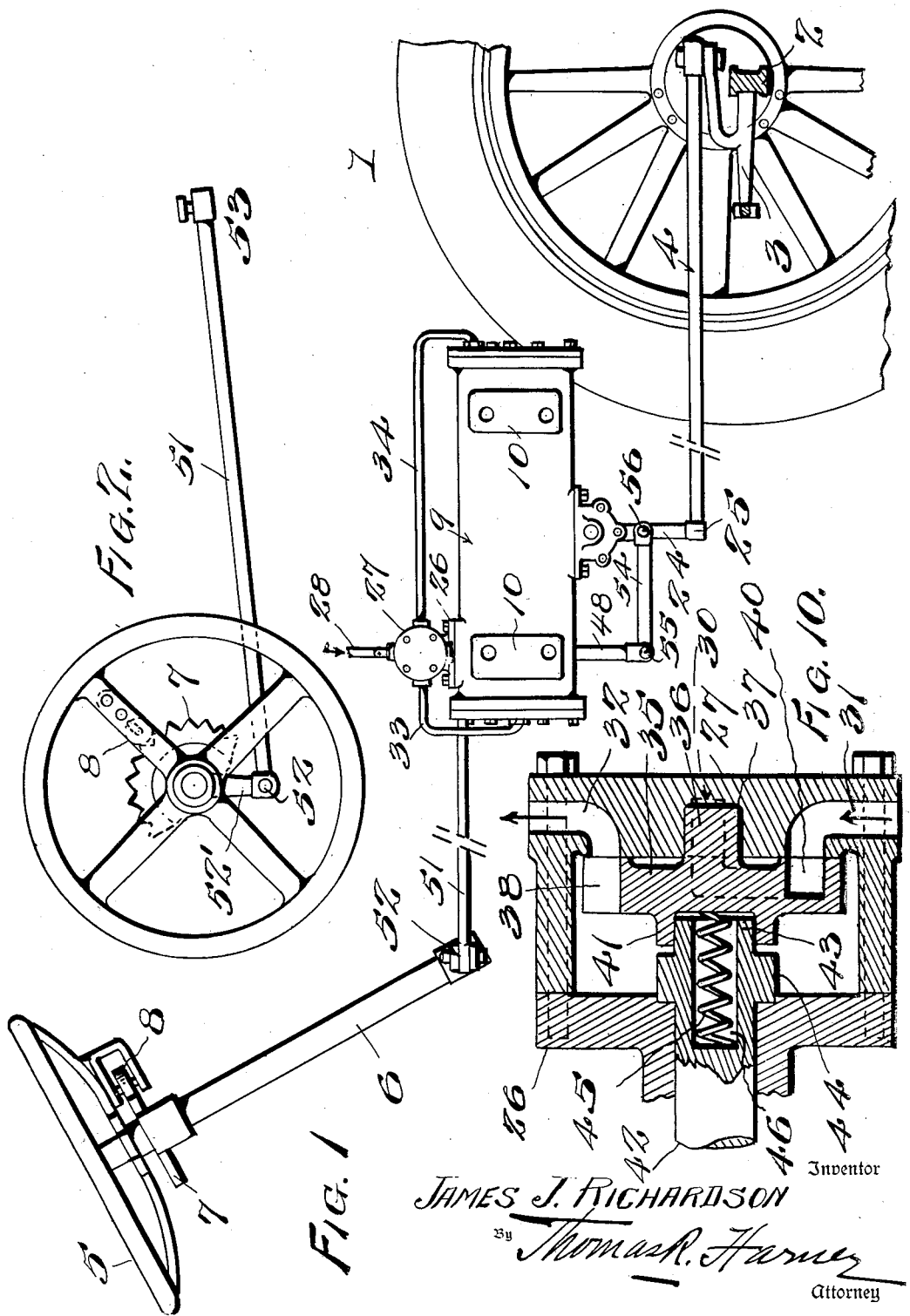

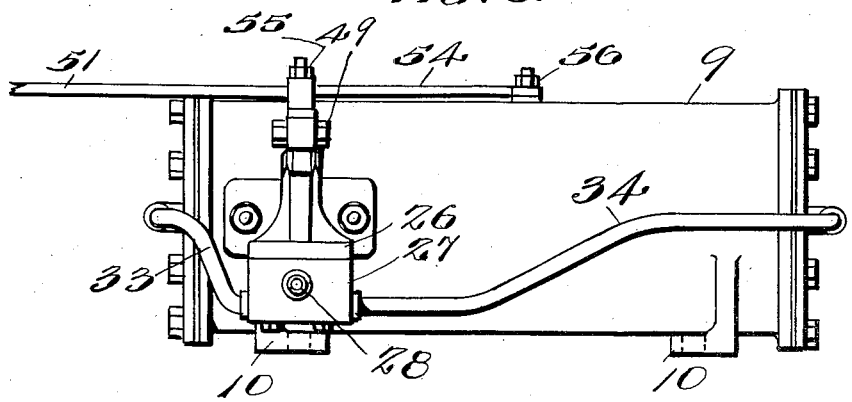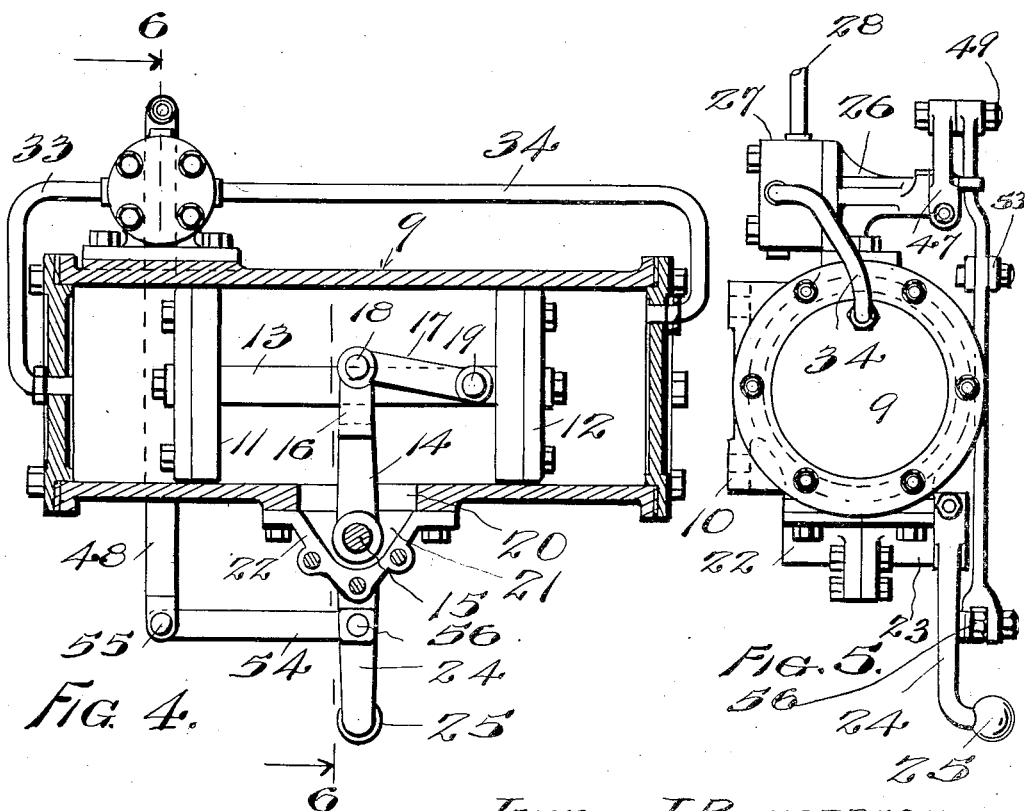

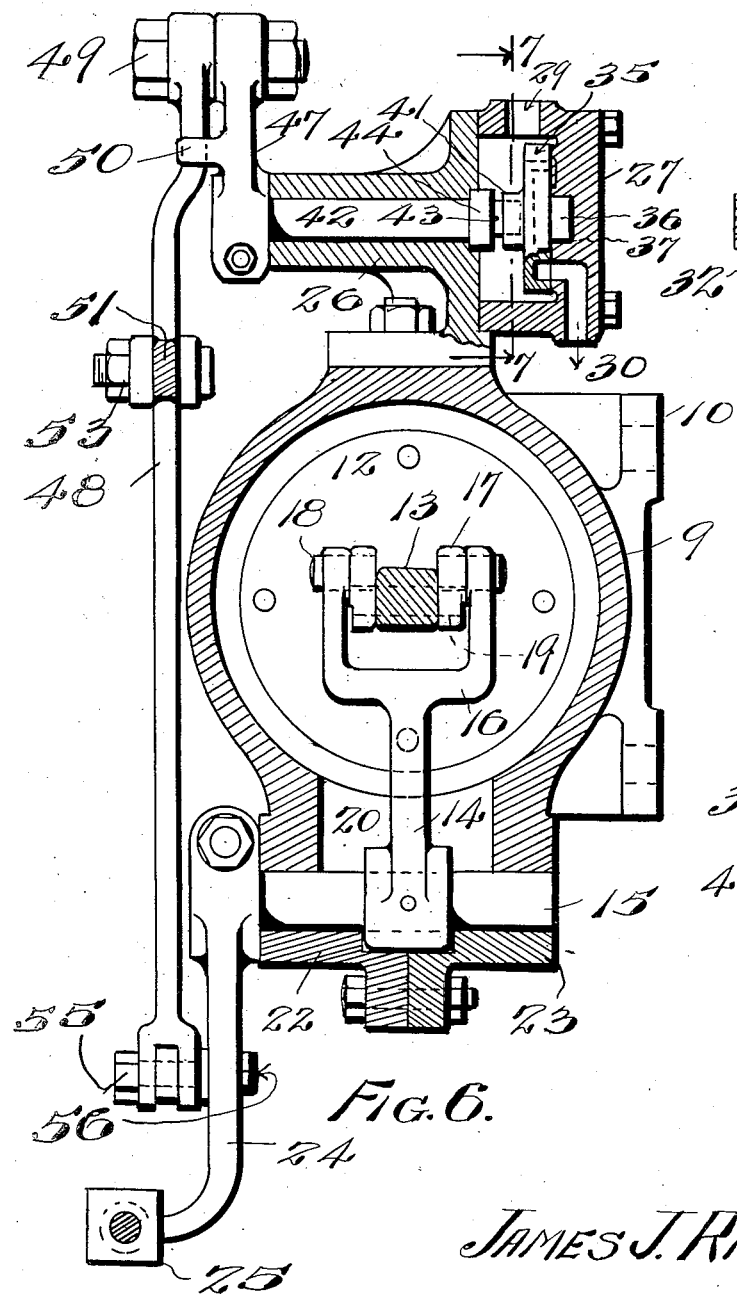
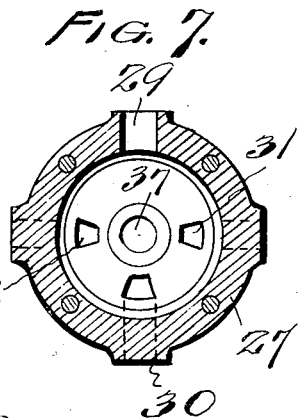
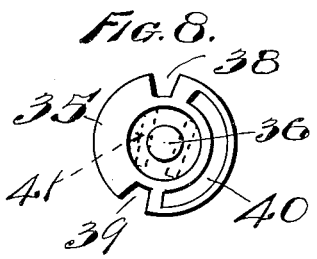
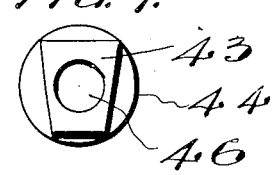

1,709,232

UNITED STATES PATENT OFFICE.

JAMES J. RICHARDSON, OF VIRGINIA, MINNESOTA.

STEERING MECHANISM.

Application filed December 19, 1927. Serial No. 241,135.

My present invention relates to improvements in steering mechanism which while adapted for various uses is particularly designed for use in connection with automotive vehicles, air craft and water craft, and as hereinafter described and illustrated is especially adapted for heavy and cumbersome automotive vehicles such as busses and trucks, and tractors.

In carrying out my invention, I utilize, in connection with the manually operated steering wheel and mechanical connections between said wheel and the front wheels of the vehicle, a pneumatically operated linkage whereby the front wheels are turned by the employment of air under pressure.

In the pneumatic operation of the steering mechanism an air cylinder is utilized, and preferably a double piston, or a piston with two spaced heads is arranged to reciprocate in the cylinder with the air pressure applied thereto under control of a rotary valve. The rotary valve is actuated from the hand wheel by the motorist or driver and the hand wheel is turned in usual manner for pneumatic operation of the front wheels of the vehicle.

While I shall hereinafter refer to the invention as applied to a bus, it will be understood that I do not limit myself to this application or installation of the invention, and changes and alterations may be made in the invention, within the scope of my claims without departing from the spirit of the invention.

In the accompanying drawings, I have illustrated one complete example of the physical embodiment of my invention wherein the parts are combined and arranged according to one of the best modes I have so far devised for the practical application of the principles of my invention.

Figure 1 is a view in side elevation showing the steering mechanism applied to one of the front wheels of an automotive vehicle, as a bus.

Figure 2 is a plan view showing the handwheel usually employed for steering automotive vehicles together with a spring pressed roller-detent and rack for retaining the handwheel and its shaft against accidental displacement.

Figure 3 is a top plan view of the air cylinder, control valve and connections.

Figure 4 is a longitudinal, vertical sectional view through the air cylinder, showing the double piston, air pipes, valve, etc.

Figure 5 is an end view as seen from the right in Figure 3.

Figure 6 is an enlarged transverse vertical sectional view at the broken line 6—6 of Figure 4.

Figure 7 is a vertical sectional view through the valve casing at line 7—7 of Figure 6.

Figure 8 is a face view of the rotary, control valve.

Figure 9 is an end view showing the wedge end of the valve stem.

Figure 10 is an enlarged detail sectional view of the control valve, casing, and valve stem.

In order that the general assembly and arrangement of parts may readily be understood I have shown in Figure 1 one of the front wheels 1 of a bus with the front axle 2 in section, and the rigging 3 of usual type actuated through the connecting rod 4 that extends toward the rear of the vehicle.

The manually operated steering wheel 5 has its shaft supported in the usual tubular post or column 6 and an arcuate or segmental rack 7 is supported on the tubular post, with which rack the roller-detent 8 co-acts to prevent accidental displacement of parts. The roller-detent is of the usual spring-pressed type, and is carried by one of the spokes of the steering wheel in such manner that the roller has a resilient bearing on the teeth of the rack, that will permit turning of the hand wheel or steering wheel, but will also prevent accidental turning of the wheel or its shaft.

The steering wheel 5 is of course located in convenient position for access by the motorist or driver, and between the steering wheel and the front wheels or front axle of the vehicle an air cylinder 9 is located, said cylinder having brackets as 10 by means of which it may be bolted to a supporting structure of the vehicle frame or chassis.

Within the air cylinder are adapted to reciprocate a pair of spaced piston heads 11 and 12 normally located at equidistant points from the longitudinal center of the cylinder, or from the heads of the cylinder, and these heads are rigidly connected by a piston rod 13, preferably square in cross section, so that the two heads will move simultaneously as one when air under pressure is alternately admitted at opposite ends of the cylinder and against the outer sides or faces of the pistons. The reciprocal movement of the double piston is transmitted through a yoke 14 to the transversely disposed rock shaft 15, and the yoke, or its forked end 16, is connected by a pair of links 17 (one at each side of the piston rod) to the rod by pivotal connections 18 and 19, as best seen in Figures 4 and 6.

The lower end of the yoke 14 passes through an opening 20 in the underside of the cylinder, which opening is of sufficient size to permit insertion of the yoke when the parts are being assembled, and a space or chamber 21, open to the cylinder through the hole 20 is provided for freedom of movement of the oscillating yoke. A bearing box in which the rock shaft 15 is journaled, and which provides the space 21, is fashioned in two sections 22 and 23 that are bolted together and also bolted to the underside of the cylinder, and these sections may be attached and detached with convenience to facilitate assembly of the parts.

On one end of the rock shaft 15 a rock arm 24 is rigidly clamped and projects downwardly therefrom, with a swivel or universal joint 25 to the connecting rod 4 of the rigging at the front of the vehicle.

The control valve is preferably located on top of the cylinder and is supported on a casting or head 26 rigidly bolted to the cylinder wall, and the valve casing 27 is rigidly bolted to one side of the head 26, said casing being of cup shape, that is, it is open at one side. The casing is bolted against the head and said casing has connected thereto an air pipe 28 which introduces air under suitable pressure through the inlet port 29 at the top of the casing. Diametrically opposite the inlet port, but in the outer wall of the casing, is located an outlet or exhaust port 30, while a pair of air ports 31 and 32 are arranged on another diameter of the round casing. The ports 30, 31 and 32 as seen in Figures 7 and 10 open through the inner face of the casing to its interior, and these ports also open through the periphery of the casing, the exhaust port to the atmosphere, and ports 31 and 32 to the respective air pipes 33 and 34 to communicate with the interior of the cylinder through its heads, and of course admit air to the outer sides of the two heads of the double piston.

The passage of air under pressure through these ports and their pipes to the cylinder is controlled by means of a rotary valve 35 in the form of a circular, flat disk enclosed within the valve casing and provided at one side with a bearing head 36 that is supported to turn in the socket 37 fashioned in the inner face of a wall of the casing. The valve has a partial rotation only, or oscillating movement, in connection with the three ports 30, 31 and 32 of the valve casing, and at its peripheral edge the disk or valve is fashioned with a pair of notches or edge-ports 38 and 39, spaced a little less than 180 degrees apart, and in the face of the disk or valve is fashioned an arcuate groove or channel 40, also of little less than 180 degrees in length. The edge ports 38 and 39 of the valve are designed to register with the two air ports and the channel or groove is designed to register with the exhaust or outlet port 30. Thus the valve may be turned to position in Figure 10 so that the edge port 38 permits pressure of air through the port 32 to the air pipe 33 and thence to the outer side of the piston head 11, while at the same time air may be and is exhausted from the outer side of the head 12 through pipe 34, port 31, channel 40 to outlet port 30. The admission of the motive fluid pressure to the cylinder, under control of the valve, causes movement of the double piston, and the shaft 15 is rocked on its center in a direction depending upon the entrance of the motive fluid to either of the ends of the cylinder.

On the back of the valve disk are arranged a pair of integral, diagonally extending lugs 41 that provide a tapering space for the stem 42, which is fashioned with a wedge end 43 fitting into the space. The valve stem is journaled in the casting or head 26 and a bearing head or enlargement 44 is provided on the stem which bearing head fits in the bearing socket or recess provided therefor in the face of the head 26 to perform the functions of a thrust bearing for the stem.

The disk of the rotary valve is held flat against the face of the valve casing with a resilient pressure to take up or compensate for wear and to make a close, airtight fit of the valve-disk against its wear face on the casing. For this purpose, a coiled spring 45 is compressed in the socket 46 in the end of the valve stem, and this spring bears against the face of the valve casing, between the two angularly disposed lugs, holding the valve in position against the face of the casing as the valve rocks or turns.

On the exterior end of the valve stem an upwardly projecting valve lever 47 is clamped, as by bolt, and this lever is pivoted to the long, upright link or floating lever 48 at 49, guide lugs or stop lugs 50 being attached to or fashioned integral with the lever 47 to limit relative movement of the lever and link between these stop lugs. This floating lever 48 has pivoted thereto an actuating bar 51, which is provided with a swivel joint 52 to the short lever arm 52' of the steering shaft, and also provided at its other end with a swivel or pivoted joint 53. A short, horizontal link 54 is pivoted at 55 to the lower end of the floating lever 48, and at 56 this short link is connected by pivot to the rock arm 24 on the rock shaft 15.

The normal position of the ports 31 and 32 is closed or lapped and the full equalized air pressure is present at all times against the outer faces of the two piston heads 11 and 12.

The valve is constructed with a slight exhaust lap, and the speed of the turning movement of the front wheels is governed by the size of the exhaust opening to the atmosphere, consequently the greater the restriction of the exhaust port 30 the slower the turning movement of the wheels.

The segmental rack 7 and hand wheel 5 and roller detent 8 are arranged in such relation to the valve and its ports that the starting and stopping movements of the piston heads are directly transmitted to the oscillating mechanism and thence to the front wheels; thus the position of these wheels corresponds to the position of the roller detent, and for each position of the hand wheel 5 there is a corresponding position of the lever 24.

The valve ports are automatically blanked or lapped through the movement of the horizontal link 54 and floating link 48, the latter turning the valve stem and valve, when pressure is applied against the outer faces of the piston heads.

From the above description taken in connection with my drawings, it will be apparent that the steering wheel 5 is mechanically connected with the front wheel 1 through the short lever 52', rod 51, long link 48, short horizontal link 54, and the connecting rod 4.

When the motive fluid, or compressed air is flowing from a suitable compressor or reservoir to the valve casing through the air pipe 28, the cylinder and piston heads are utilized for transmitting the power of the compressed air to the rock shaft 15, rock arm 24 and the connecting rod 4, the flow of air under pressure being controlled by the movement of the valve as described. Thus the air pressure is controlled by the manipulation of the valve and the power of the air pressure is applied through the oscillating mechanism to the connecting rod and steering rigging at the front of the bus to turn the front wheels of the bus. The manual exertion is necessary only for control of the valve, but the steering mechanism is kept at all times under the direct control of the steering wheel 5, and of course the driver or motorist has the wheel 5 under control of his hand or hands at all times.

Various changes and alterations may be made, and are contemplated in the exemplified structure of the drawings, in order that the equipment may be applied to water or air craft, or to different types of motor vehicles, and these changes may be made without departing from the principles of my invention as embodied in the following claims.

Having thus fully described my invention, what I claim as new and desire to secure by Letters Patent is—

1. In a vehicle steering mechanism including a steering member, the combination of a fluid motor, a rotary valve therefor and a rotatable lever on the valve, an oscillatable steering arm mounted on and operated by the motor, and a link connection between the valve lever and the steering arm, said connection being operated from the steering member.

2. In a vehicle steering mechanism including a steering member, the combination of a fluid motor, a rotary valve therefor and a rotatable operating-lever on the valve, an oscillatable steering arm operated by the motor, a link connection between the valve lever and the steering arm, said link connection being operated from the steering member, and means on the valve lever cooperating with the link connection for limiting relative movement of the link connection and lever arm.

3. In a vehicle steering mechanism including a steering member, the combination with a fluid motor, a rotary valve therefor and a rotatable operating-lever on the valve, a rock shaft operated by the motor and a rock arm on the shaft for steering the vehicle wheels, a floating lever between the valve lever and the rock arm, and said floating lever being operated from the steering member.

4. In a vehicle steering mechanism including a steering member, the combination of a fluid motor including an air cylinder, a pair of spaced pistons in the cylinder, and a rotary valve for controlling admission of air to the opposite ends of the cylinder, a rotatable valve-operating lever, a rock shaft operated by the movement of the pistons and a rock arm on the shaft for steering the vehicle wheels, a floating lever between the valve-operating lever and the rock arm, and said floating lever being operated from the steering member.

5. In a vehicle steering mechanism including a steering member, the combination of a fluid motor, a rotary valve therefor and a rotatable operating-lever for the valve, an oscillatable steering arm operated by the motor, a link connection between the valve lever and the steering arm, spaced lugs on the valve lever for limiting relative movement of the link connection, and said link connection being operated from the steering member.

In testimony whereof I have affixed my signature.

JAMES J. RICHARDSON.